(12) United States Patent
Kushnirskiy

(10) Patent No.: US 7,269,833 B2
(45) Date of Patent: Sep. 11, 2007

(54) SCRIPTABLE PLUG-IN APPLICATION PROGRAMMING INTERFACE

(75) Inventor: Igor Davidovich Kushnirskiy, Sunnyvale, CA (US)

(73) Assignee: Sun Microsystems, Inc., Menlo Park, CA (US)

(*) Notice: Subject to any disclaimer, the term of this patent is extended or adjusted under 35 U.S.C. 154(b) by 939 days.

(21) Appl. No.: 10/023,008

(22) Filed: Dec. 12, 2001

(65) Prior Publication Data

US 2003/0149801 A1 Aug. 7, 2003

(51) Int. Cl.
*G06F 3/00* (2006.01)
(52) U.S. Cl. ...................................... 719/328
(58) Field of Classification Search ................ 719/328, 719/310
See application file for complete search history.

(56) References Cited

U.S. PATENT DOCUMENTS 6,658,453 B1 * 12/2003 Dattatri ...................... 709/202
6,691,176 B1 * 2/2004 Narin et al. ................. 719/318
6,854,123 B1 * 2/2005 Lewallen .................... 719/328

OTHER PUBLICATIONS

Netscape Gecko Technologies, Enabling the Next-Generation Internet, 1999.*
XP, XPCom, Jun. 1999.*
The open Group, The Active X Core Technology Reference, 1999.*
John Bandhauer, A zero generated code XPConnect proposal, Dec. 1998.*

* cited by examiner

*Primary Examiner*—William Thomson
*Assistant Examiner*—LeChi Truong
(74) *Attorney, Agent, or Firm*—Sonnenschein, Nath & Rosenthal, LLP

(57) ABSTRACT

Embodiments of the present invention relate to a scriptable plug-in API. According to the invention, all of the interfaces in a conventional, non-scriptable plug-in API are mapped to similar interfaces in a scriptable plug-in API. There is no need to change the existing plug-in APIs. In one embodiment, a set of interfaces and a set of wrappers are used to bind the new, scriptable plug-in API to the old one. In another embodiment, C++ wrappers are written to bridge new API to the old one. Inter-threading calls for plug-ins are also made possible using a proxy that functions with scriptable interfaces. In another embodiment, the plug-in is written for a Mozilla™/Netscape™ 6.x browser. In another embodiment, the scripting languages used to develop the plug-in include Python, JavaScript, and Perl.

18 Claims, 8 Drawing Sheets

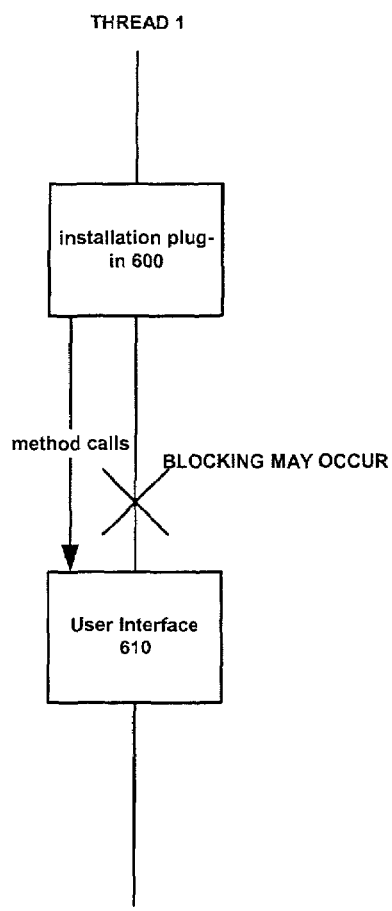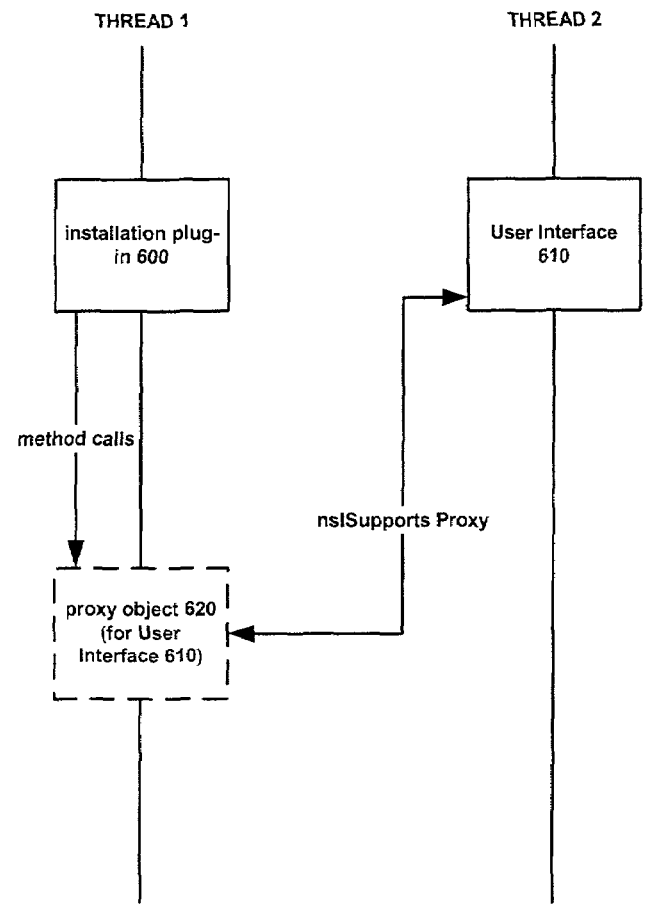
FIGURE 6A
FIGURE 6B

SCRIPTABLE PLUG-IN APPLICATION PROGRAMMING INTERFACE

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The present invention relates to an application programming interface (API) for writing a scriptable plug-in.

2. Background Art

Platform independent programming languages allow a virtual machine to be opened in a host application. The virtual machine creates its own environment within the host application and runs computer programs in its environment without regard to the type of computer system the host application is running. This is useful, for instance, when a person is using the Internet and the virtual machine is opened in a host application such as a web browser.

To extend the functionality of the web browser, plug-ins are used. The use of a plug-in allows a developer to write a computer program that performs some desired task from within the web browser. For instance, a common plug-in relates to sound. When a web page on the Internet is encountered that uses sound, the appropriate plug-in is initiated and it instructs the web browser how to handle the sounds and play them for the user.

An application program interface (API) is often used by a developer to create plug-ins. Current plug-in APIs are non-scriptable, meaning that they cannot be implemented in scripting languages such as Javascript, Perl or Python. This is disadvantageous because the large number of script developers and existing scripting codes cannot be leveraged in plug-in programming. Before further discussing this problem, an overview of platform independent programming languages is provided.

Platform Independent Programming Language

An example of a platform independent programming language is the Java™ technology platform. A program which utilizes Java™ technology is composed of a number of classes and interfaces. Unlike many programming languages, in which a program is compiled into machine-dependent, executable program code, programs which utilize Java™ technology are compiled into machine independent bytecode class files. Each class contains code and data in a platform-independent format called the class file format. The computer system acting as the execution vehicle contains a program called a virtual machine, which is responsible for executing the code in classes. The virtual machine provides a level of abstraction between the machine independence of the bytecode classes and the machine-dependent instruction set of the underlying computer hardware. FIG. 1 is a block diagram illustrating a sample network application environment, for instance a Java™ technology network application environment, comprising a client platform 102 coupled over a network 101 to a server 100 for the purpose of accessing class files for execution of an application or applet.

Sample Network Application Environment

In FIG. 1, server 100 comprises development environment 104 for use in creating the class files for a given application. The development environment 104 provides a mechanism, such as an editor and an applet viewer, for generating class files and previewing applets. A set of core classes 103 comprise a library of classes that can be referenced by source files containing other classes. From development environment 104, one or more source files 105 are generated. Source files 105 contain the programmer readable class definitions, including data structures, method implementations and references to other classes. Source files 105 are provided to compiler 106, which compiles source files 105 into compiled ".class" files 107 that contain bytecodes executable by a virtual machine. Bytecode class files 107 are stored (e.g., in temporary or permanent storage) on server 100, and are available for download over network 101.

Client platform 102 contains a virtual machine (VM) 111 which, through the use of available native operating system (O/S) calls 112, is able to execute bytecode class files and execute native O/S calls when necessary during execution. Class files are often identified in applet tags within an HTML (hypertext markup language) document. A web server application 108 is executed on server 100 to respond to HTTP (hypertext transport protocol) requests containing URLs (universal resource locators) to HTML documents, also referred to as "web pages." When a browser application executing on client platform 102 requests an HTML document, such as by forwarding URL 109 to web server 108, the browser automatically initiates the download of the class files 107 identified in the applet tag of the HTML document. Class files 107 are typically downloaded from the server and loaded into virtual machine 111 individually as needed.

It is typical for the classes of a program to be loaded as late during the program's execution as possible; they are loaded on demand from the network (stored on a server), or from a local file system, when first referenced during the program's execution. The virtual machine locates and loads each class file, parses the class file format, allocates memory for the class's various components, and links the class with other already loaded classes. This process makes the code in the class readily executable by the virtual machine.

Plug-In API

With the understanding of platform independent programming languages and networking environment in place, the obstacles of non-scriptable Plug-in API is now discussed. There are two main obstacles. First, current plug-in APIs are non-scriptable, meaning that they cannot be implemented in scripting languages such as Javascript, Perl or Python. This is disadvantageous because the large number of script developers and existing scripting codes cannot be leveraged in plug-in programming.

The second obstacle is found the non-scriptable limitation of XPCOM (Cross Platform Component Object Model). XPCOM is a technology that allows software components written in various programming languages to communicate with one another within the browser environment. However, the powerful potential of having software modules written in different languages working together does not extend to modules written in scripting languages. As such, software components developed in XPCOM cannot be bound to software modules implemented in scriptable languages.

SUMMARY OF THE INVENTION

Embodiments of the present invention relate to a scriptable plug-in API. According to embodiments of the invention, all of the interfaces in a conventional, non-scriptable plug-in API are mapped to similar interfaces in a scriptable plug-in API. There is no need to change the existing plug-in APIs. In one embodiment of the present invention, a set of interfaces and a set of wrappers are used to bind the new, scriptable plug-in API to the old one.

In one embodiment of the present invention, the interfaces comprise at least a header and a code file and an IDL (Interface Definition Language) language file used in the cross platform standard XPCOM. In another embodiment of the present invention, through the use of XPConnect, an interface for connecting scriptable objects to XPCOM objects, the scriptable plug-in API is mapped to the non-scriptable plug-in API. In one embodiment of the present invention, the following interfaces are made scriptable: Input Stream, Output Stream, Plugin, Plugin Instance, Plugin Instance Peer, Plugin Manager, Plugin Manager 2, Plugin Stream Information, Plugin Stream Listener, Plugin Tag Information, Plugin Tag Information 2.

In one embodiment of the present invention, inter-threading calls for plug-ins are also made possible using a proxy that functions with scriptable interfaces. In one embodiment of the present invention, the plug-in is written for a Mozilla™/Netscape™ 6.x browser. In another embodiment of the present invention, the scripting languages used to develop the plug-in include Python, JavaScript, and Perl.

BRIEF DESCRIPTION OF THE DRAWINGS

These and other features, aspects and advantages of the present invention will become better understood with regard to the following description, appended claims and accompanying drawings where:

FIG. 6A shows the architecture for in-thread calling.

FIG. 6B shows the architecture for inter-thread calling according to an embodiment of the present invention.

DETAILED DESCRIPTION OF THE INVENTION

Embodiments of the present invention relate to a scriptable plug-in API. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Scriptable Plug-in API Architecture

Figure 1:
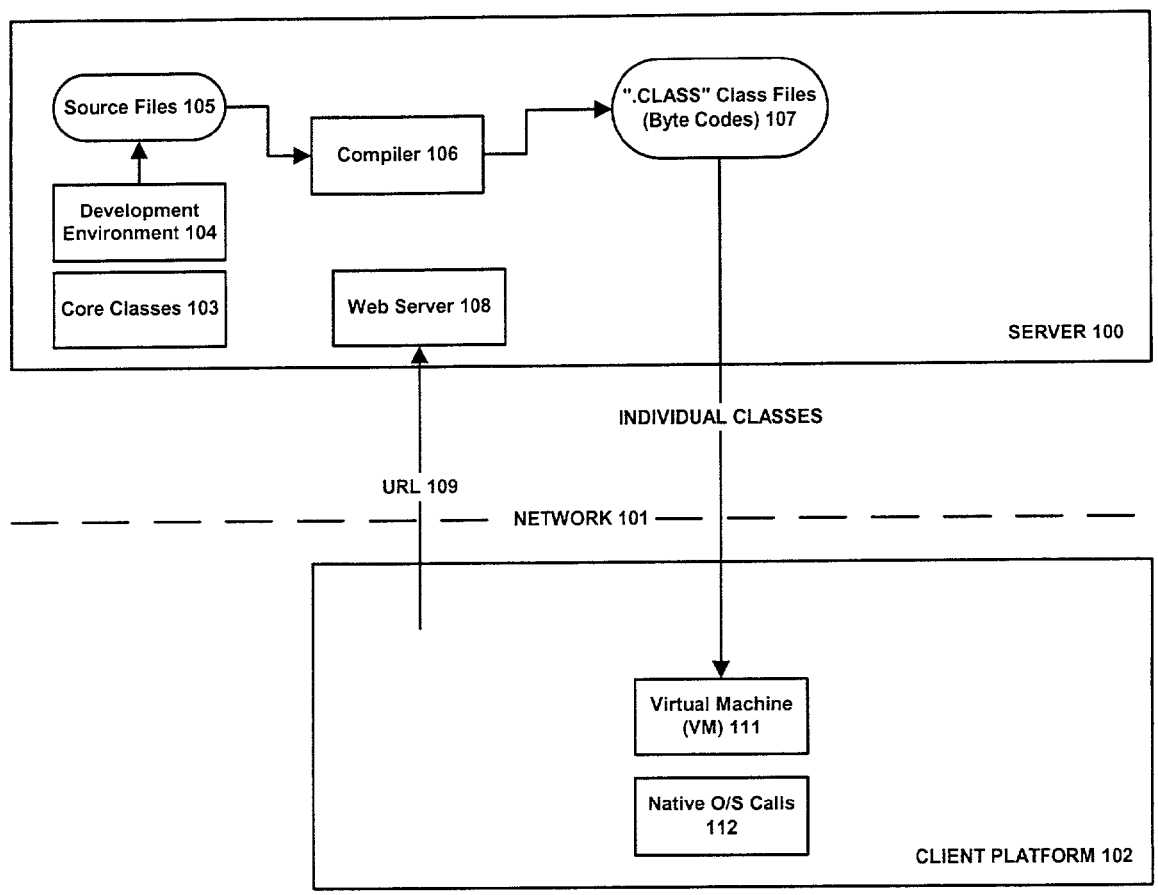
FIG. 1 is a diagram of a sample network application environment.
Figure 2:
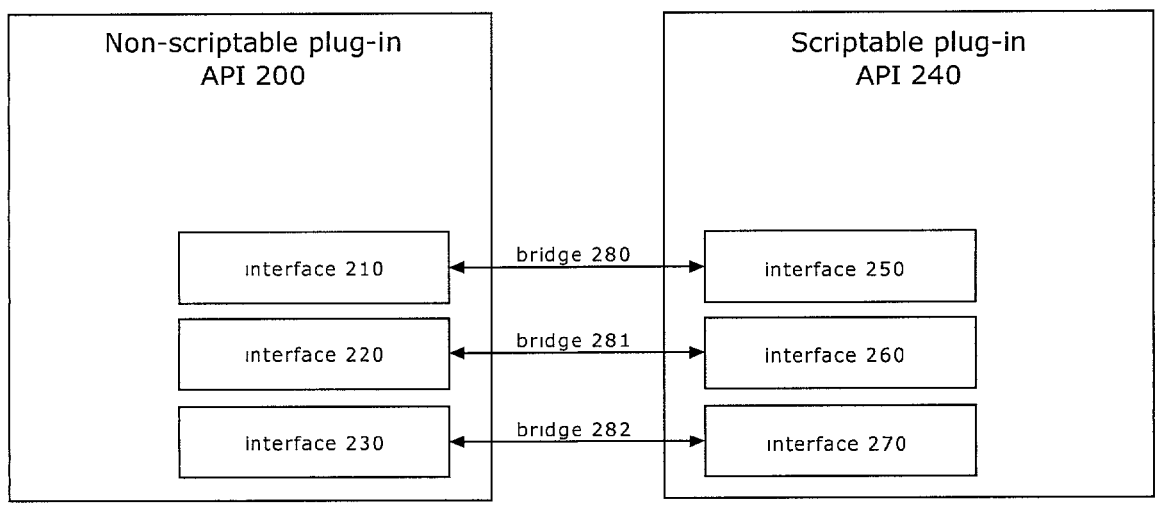
FIG. 2 is a scriptable plug-in API according to an embodiment of the present invention.

According to one or more embodiments of the invention, all of the interfaces in a conventional, non-scriptable plug-in API are mapped to similar interfaces in a scriptable plug-in API via a bridge. Bridges are software modules that allow two incompatible interfaces to operate with each another. More specifically, bridges map the functionality of one interface to another interface. As such, with these bridges in place there is no need to change the existing non-scriptable plug-in API. FIG. 2 shows a diagram of a scriptable plug-in API architecture. Non-scriptable plug-in API 200 has interfaces 210, 220 and 230. Scriptable plug-in API 240 has interfaces 250, 260, and 270. Bridges 280, 281, and 282 are used to map interface 210 to 250, 220 to 260 and 230 to 270 respectively. In one or more embodiments of the present invention, there is a one to one mapping of interfaces in the non-scriptable and scriptable versions of the API 200 and 240. Hence, the existing non-scriptable plug-in API 200 needs no modification to allow for new scriptable plug-ins. The new scriptable plug-ins can implement scriptable plug-in API 240, which operates on top of non-scriptable plug-in API 200 and interfaces with it through the bridges 280, 281, and 282. Thus, the new scriptable plug-ins have access to all functionality of the existing non-scriptable plug-in API.

Figure 3:
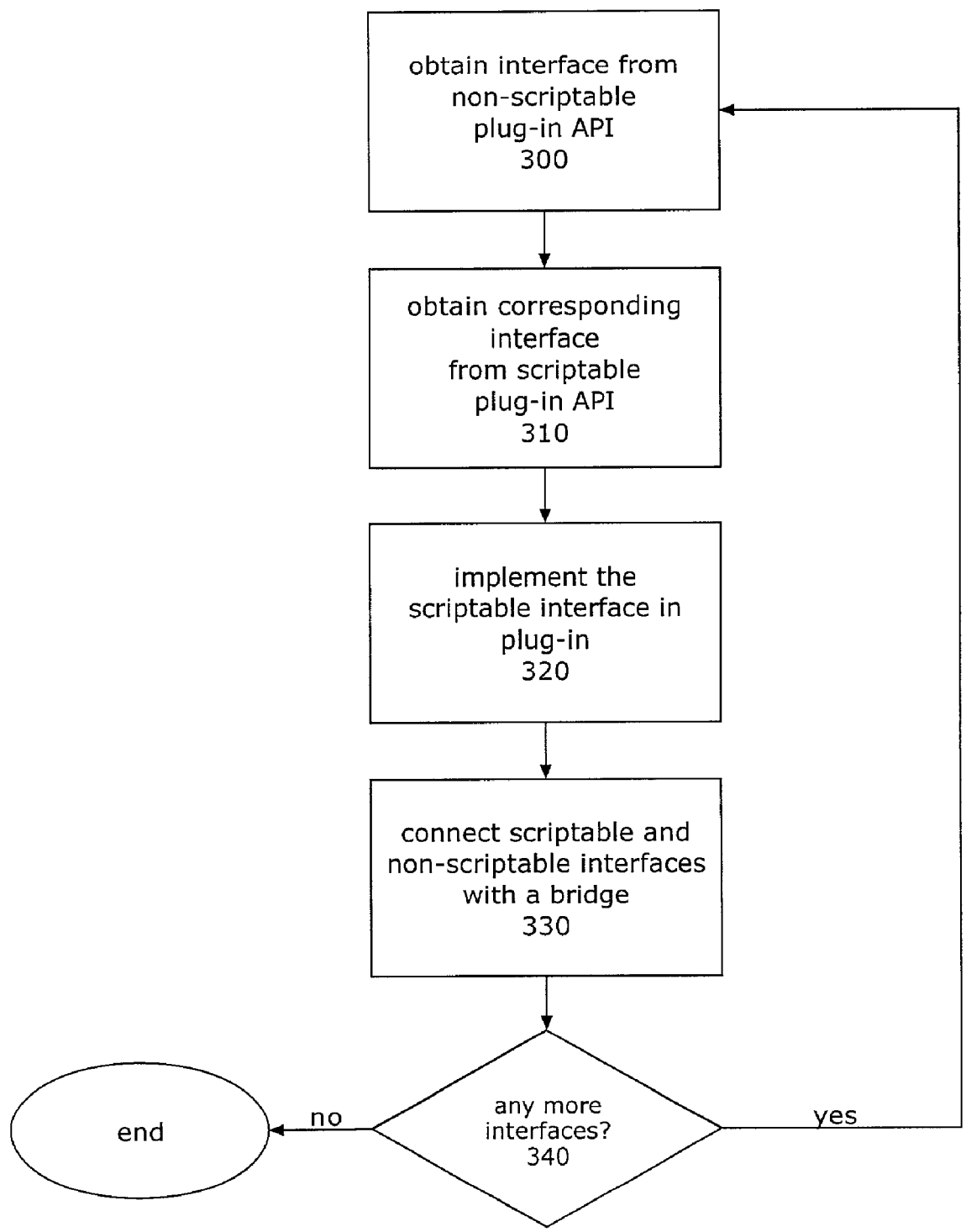
FIG. 3 shows the steps taken to implement a scriptable plug-in API according to an embodiment of the present invention.

An implementation of scriptable plug-in according to an embodiment of the present invention is shown in the flowchart of FIG. 3. At block 300, an interface from the non-scriptable plug-in API is obtained. At block 310, a corresponding interface from the scriptable API is obtained. At block 320, the scriptable interface is implemented in the plug-in. The implementation of the interface involves making functions in the plug-in conform to the requirements of the scriptable interface. At block 330, the scriptable and non-scriptable interfaces are connected with a bridge. In one embodiment or more embodiments of the present invention, bridges are a set of interfaces and a set of C++ wrappers used to bind the new, scriptable API to the old, non-scriptable one. At block 340, it is determined if there are any more interfaces for the plug-in to implement. If not, the process ends. Otherwise, block 300 repeats. In one or more embodiments of the present invention, the plug-in is written for a Mozilla™/Netscape™ 6.x browser.

XPConnect Scriptable Components

In one embodiment of the present invention, an interface is used to connect a scriptable language API to a cross platform language API. An example of such an interface is XPConnect. It is a technology which enables interoperation between XPCOM and JavaScript. Javascript is an example of a scriptable language API while XPCOM is an example of a cross platform language that allows software components written in various programming languages to communicate with one another within the browser environment. In one or more embodiments of the present invention, XPConnect allows JavaScript objects to transparently access and manipulate XPCOM objects. XPConnect does this by enabling JavaScript objects to present XPCOM compliant interfaces. Thus with XPConnect, Javascript objects can behave as XPCOM objects and reap the benefit of interoperability that XPCOM provides. XPConnect has been discussed with respect to the JavaScript language but it has equal applicability to other common scripting languages, such as Python and Perl.

Figure 4A:
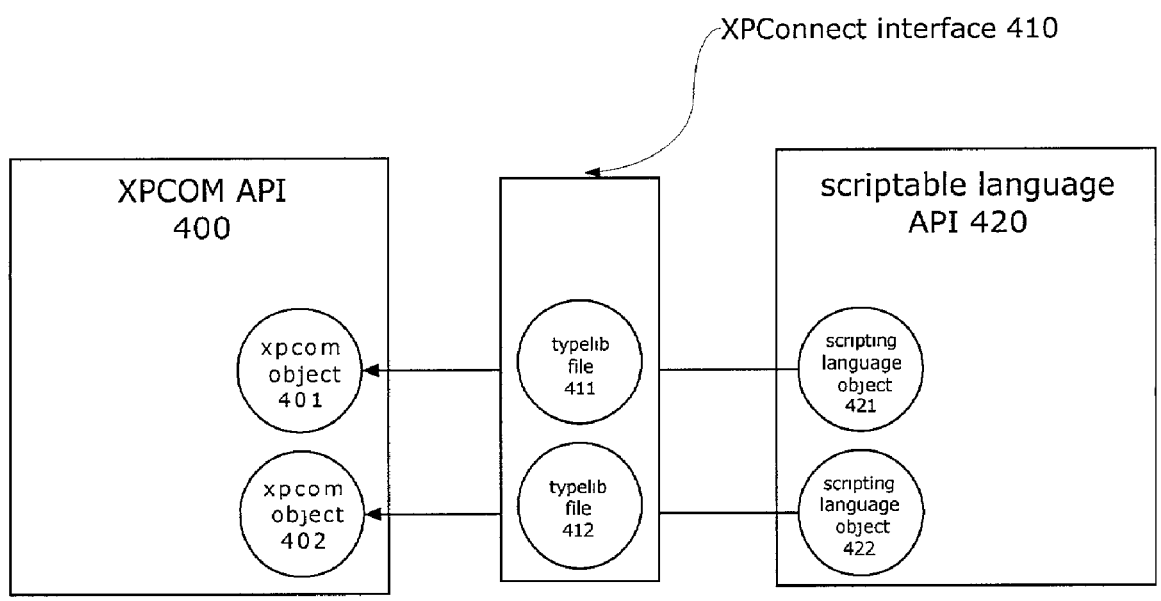
FIG. 4A shows the architecture of the API according to an embodiment of the present invention.

FIG. 4A shows the architecture of XPConnect according to an embodiment of the present invention. XPCOM API 400 and scripting language API 420 are connected via XPConnect interface 410. Each XPCOM object has an associated typelib file that is generated in the process of creating the XPCOM object. XPConnect interface 410 uses typelib files 411 and 412 to connect scripting language objects 421 and 422 with XPCOM objects 401 and 402. The typelib files allow the XPConnect glue code to dynamically build proxy objects at runtime to dispatch method calls and handle property accesses between XPCOM and JavaScript objects. In one embodiment of the present invention, the architecture also defines the nsIXPCScriptable interface, an interface that allows XPCOM objects with scripting specific requirements to have more control over how they are represented as JavaScript objects.

Figure 4B:
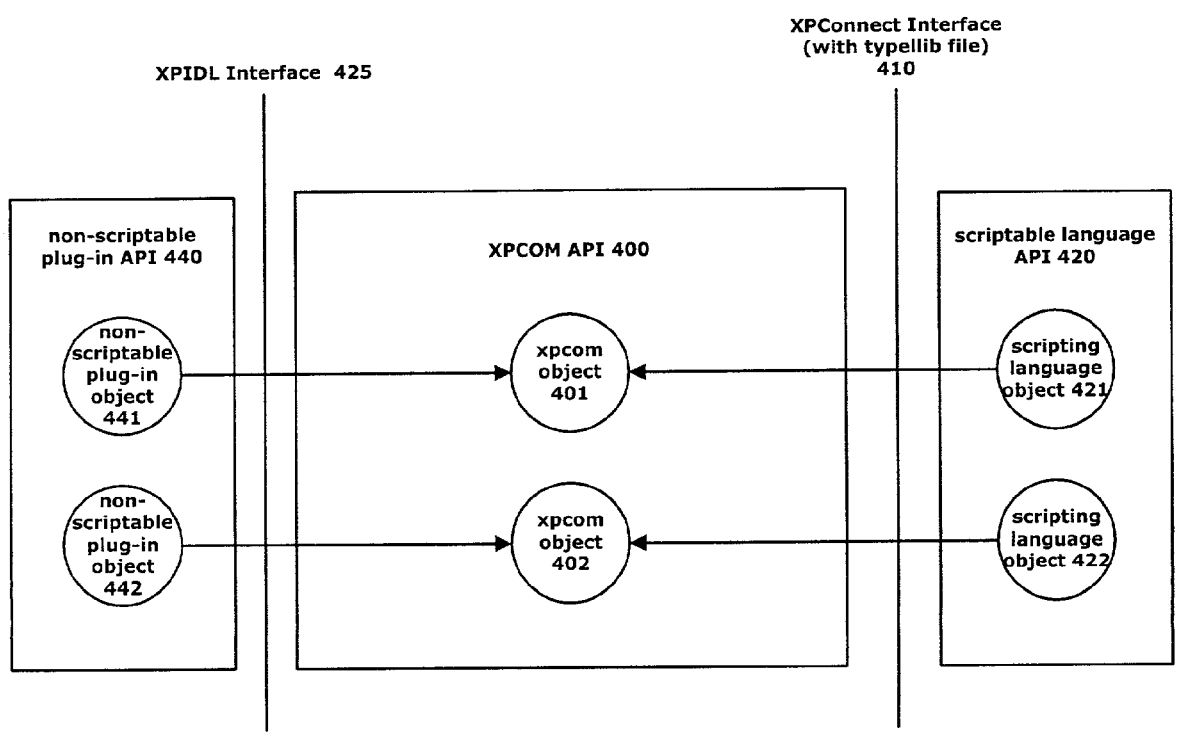
FIG. 4B shows the architecture of the API according to an embodiment of the present invention.

Having access to XPCOM objects means that scripting language objects can now access objects implemented in non-scriptable plug-in API. FIG. 4B shows the architecture according to an embodiment of the present invention that enables such access. Non-Scriptable plug-in objects 441 and 442 of non-scriptable plug-in API 440 are made into XPCOM objects 401 and 402, respectively. The process involves generating XPCOM objects out of non-scriptable plug-in objects 441 and 442 using an XPIDL compiler. XPIDL is a IDL (Interface Definition Language) based language with some extensions to support added XPCOM and XPConnect requirements. For example, the non-scriptable plug-in API maybe in C++. Then the XPIDL compiler is used to generate both C++ header files and typelib files to be used later by XPConnect. The C++ header files are functionally identical to the header files of the C++ non-scriptable plug-in objects. After the XPIDL compilation process, the XPCOM objects representing the C++ objects are generated. The new XPCOM objects allow interoperability other XPCOM objects, which may represent objects implemented in other programming languages. In FIG. 4B, XPCOM objects 401 and 402 behave as stand-in objects, hiding the underlying implementation of the non-scriptable plug-in objects 441 and 442.

In turn, the new XPCOM objects 401 and 402 are accessed by scripting language objects 421 and 422 via XPConnect interface 410. Thus XPConnect works in conjunction with the XPCOM API to enable scripting language objects to access objects created under non-scriptable plug-in API 440. This in turn enables the programming of plug-ins in scriptable languages.

Figure 5:
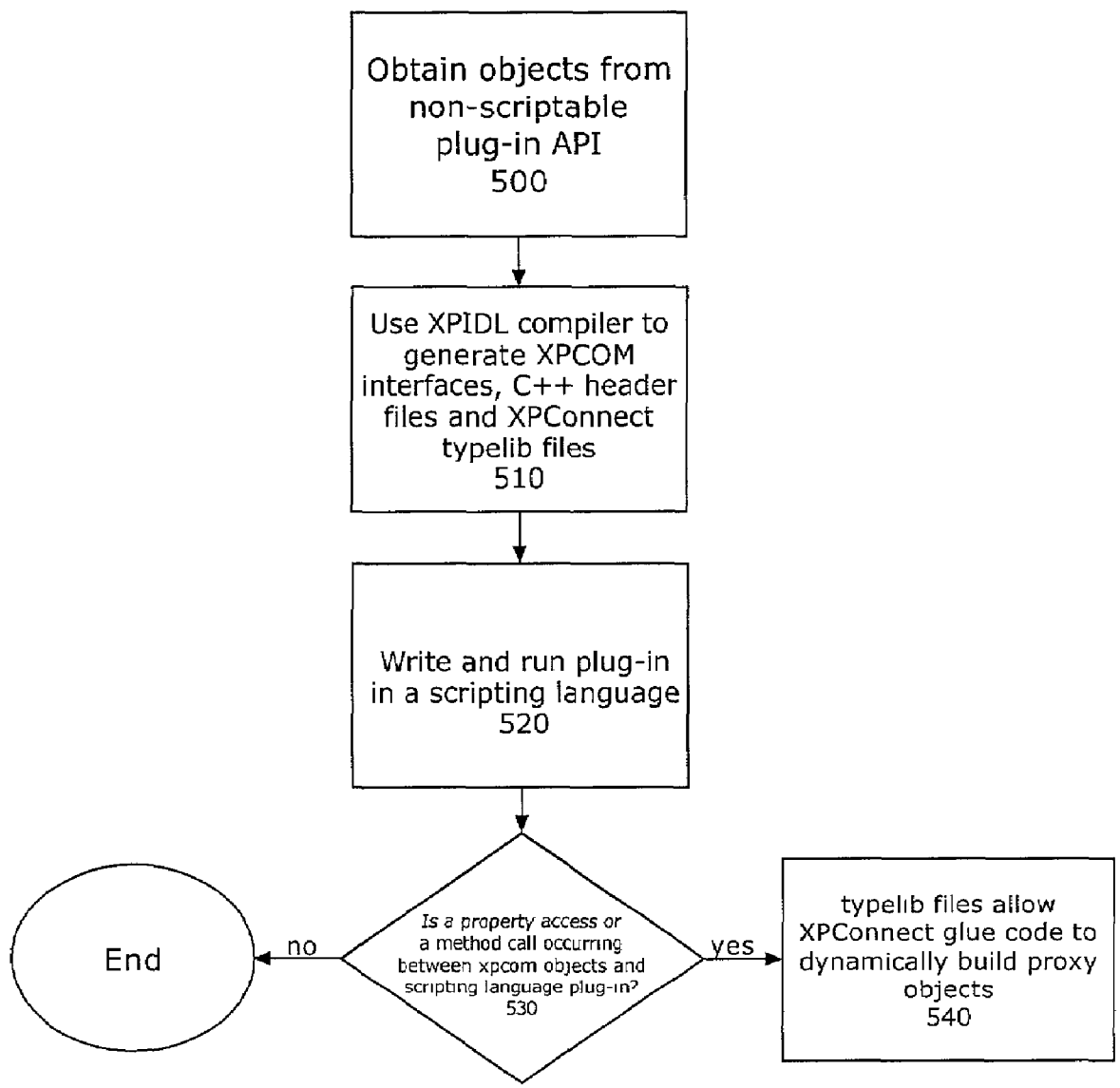
FIG. 5 shows the steps taken to implement the API according to an embodiment of the present invention.

FIG. 5 shows the steps taken by an implementation of XPConnect according to an embodiment of the present invention. At block 500, objects within non-scriptable plug-in API are obtained. At block 510, the XPIDL compiler generates XPCOM interfaces for the non-scriptable plug-in objects, C++ header files and XPConnect typelib files. The C++ header files are functionally identical to the header files of the C++ non-scriptable plug-in objects. The typelib files are to be used by XPConnect later. At block 520, a plug-in is written in a scriptable language and it is run. At block 530, it is determined if a property access or a method call between XPCOM objects (which represent the C++ objects from non-scriptable plug-in API) and the scripting language plug-in is occurring. If so, the typelib files allow the XPConnect glue code to dynamically build proxy objects at block 540. Otherwise, the process terminates. Thus, via XPConnect and XPCOM, the plug-in that is in scripting language can access all the functionality defined in the non-scriptable plug-in API.

Inter-thread Calls

The ability to create plug-ins using scriptable languages enables plug-ins to take advantage of existing inter-thread calling mechanisms that work only with scriptable interfaces. One such mechanism is nsISupports proxy. An nsISupports proxy is a stub object which enables a method of any class to be called on any in-process thread. The only requirement is that the class needs to be derived from a base class called nsISupports and have a typelib file.

FIG. 6A and 6B shows how a scriptable plug-in can make an inter-threading call according to an embodiment of the present invention. In the Mozilla™ browser environment, Javascript and User Interface are defaulted to be on a single thread. When one is busy, the other is blocked. This is shown in FIG. 6A. Unlike the majority of Javascripts which are small and can be quickly run, installation plug-in 600 is a Javascript-based module that performs installation tasks that require long execution time due to unzipping or native file system actions. If installation plug-in 600 ran on the same thread as the User Interface 610, as in the default setting, then User Interface 610 would be blocked and appear frozen until the installation plug-in 600 script was completed.

To work around this, installation plug-in 600 was moved to its own thread as shown in FIG. 6B. Now installation plug-in 600 performs its installations while the User Interface 610 continues to render on screen and the two do not interfere with one another. However, because the two modules are on different threads, installation plug-in 600 cannot access User Interface elements such as a progress meter or a confirmation dialog. This is where nsISupports proxy comes in. The nsISupports proxy creates a proxy object 620 that represents the User Interface 610 on the same thread as installation plug-in 600. Installation plug-in 600 can now treat proxy object 620 as a real object on its thread and call methods of User Interface 610 in proxy object 620. Thus inter-thread calling is achieved.

Interfaces

According to one or more embodiments of the present invention there is no need to change the existing non-scriptable plug-in API. Instead, a set of scriptable interfaces are defined along with a set of wrappers to bind the API of the present invention to the old non-scriptable API. In one embodiment of the present invention, the following interfaces from the non-scriptable API are made to be scriptable:

nsIInputStream, nsIOutputStream, nsIPlugin, nsIPluginInstance, nsIPluginInstancePeer, nsIPluginManager, nsIPluginManager2, nsIPluginStreamInfo, nsIPluginStreamListener, nsIPluginTagInfo, and nsIPluginTagInfo 2

The corresponding IDL (Interface Definition Language) files are:

nsIXPIDLInputStream.idl, nsIXPIDLOutputStream.idl, nsIXPIDLPlugin.idl, nsIXPIDLPluginInstance.idl, nsIXPIDLPluginInstancePeer.idl, nsIXPIDLPluginManager.idl, nsIXPIDLPluginManager2.idl, nsIXPIDLPluginStreamInfo.idl, nsIXPIDLPluginStreamListener.idl, nsIXPIDLPluginTagInfo.idl, and nsIXPIDLPluginTagInfo2.idl.

The IDL files are generated by XPIDL and are used by XPCOM to provide XPCOM interfaces to the C based interfaces. Scriptablity is achieved when the IDLs are used in conjunction with XPConnect. The non-scriptable plug-in API interfaces are listed below. In each interface, the IDL file is listed first. Then the C implementation of the interface is listed. Finally listed is the C header file. Both the C implementation and C header file are needed for the usage of XPCOM and XPConnect.

Interface: Input Stream

Description: an interface designed to handle the input stream of data for the plug-in The scriptable IDL for this interface is nsIXPIDLInputStream.idl and is as follows:

```
# include "nsISupports.idl"
# pragma prefix
```

```
[scriptable, uuid (b3199ec2-37c6-4c41-9e18-2a655bc4400e)]
interface nsIXPIDLInputStream : nsISupports
{
    void close( );
    unsigned long available( );
    unsigned long read( in unsigned long count,
        [array, size_is(count)] in octet buf );
};
```

The C code file for the interface is:

```
# include "nsXPIDLInputStream.h"
# include "nsIInputStream.h"
NS_IMPL_ISUPPORTS1(nsXPIDLInputStream, nsIXPIDLInputStream)
nsXPIDLInputStream::nsXPIDLInputStream( )
{
    NS_INIT_SUPPORT( );
}
nsXPIDLInputStream::nsXPIDLInputStream( nsIInputStream
*inputStream )
{
    NS_INIT_ISUPPORTS( );
    this- >inputStream = inputStream;
    NS_ADDREF( inputStream );
}
nsXPIDLInputStream::~nsXPIDLInputStream( )
{
    NS_RELEASE( inputStream );
}
NS_IMETHODIMP
nsXPIDLInputStream::Close( )
{
    return inputStream- >Close( );
}
NS_IMETHODIMP
nsXPIDLInputStream::Available( PRUint32 *_retval )
{
    return inputStream- >Available(_retval );
}
NS_ IMETHODIMP
nsXPIDLInputStream::Read( PRUint32 count,
    PRUint8 *buf,
    PRUint32 *_retval)
{
    return inputStream- >Read((char *)buf,
        count, _retval);
}
The C header file for the interface is as follows:
# ifndef __nsXPIDLInputStream_included__
# define __nsXPIDLInputStream_included__
# include "nsIXPIDLInputStream.h"
# include "nsIInputStream.h"
class nsXPIDLInputStream : public nsIXPIDLInputStream
{
public:
    NS_DECL_ISUPPORTS
    NS_DECL_NSIXPIDLINPUTSTREAM
nsXPIDLInputStream( );
nsXPIDLInputStream( nsIInputStream *inputStream );
virtual ~nsXPIDLInputStream( );
nsIInputStream *inputStream;
};
# endif // __nsXPIDLInputStream_included__
Interface: Output Stream
Description: an interface designed to handle the output
stream of data for the plug-in
The scriptable IDL for this interface is
nsIXPIDLOutputStream.idl and is as follows:
# include "nsISupports.idl"
# pragma prefix
[scriptable,
uuid(5be17648-6b93-4a17-9d2e-e2fdcff738ee)]
interface nsIXPIDLOutputStream : nsISupports
{
    void close( );
    void flush( );
    unsigned long write( in unsigned long count,
        [array, size_is(count)] in octet buf );
};
```

The C code file for the interface is:

```
# include "nsXPIDLOutputStream.h"
NS_IMPL_ISUPPORTS1(nsXPIDLOutputStream,
nsIXPIDLOutputStream)
nsXPIDLOutputStream::nsXPIDLOutputStream( )
{
    NS_INIT_ISUPPORTS( );
}
nsXPIDLOutputStream::nsXPIDLOutputStream(
nsIOutputStream *outputStream)
{
    NS_INIT_ISUPPORTS( );
    this- >outputStream = outputStream;
    NS_ADDREF( outputStream );
}
nsXPIDLOutputStream::~nsXPIDLOutputStream( )
{
    NS_RELEASE( outputStream );
}
NS_IMETHODIMP
nsXPIDLOutputStream::Close( )
{
    return outputStream- >Close( );
}
NS_IMETHODIMP
nsXPIDLOutputStream::Flush( )
{
    return outputStream- >Flush( );
}
NS_IMETHODIMP
nsXPIDLOutputStream::Write( PRUint32 count,
    PRUint8 *buf,
    PRUint32 *_retval)
{
    return outputStream- >Write((char *)buf,
        count, _retval);
}
The C header file for the interface is as follows:
# ifndef __nsXPIDLOutputStream_included__
# define __nsXPIDLOutputStream_included__
# include "nsXPIDLOutputStream.h"
# include "nsIOutputStream.h"
class nsXPIDLOutputStream : public nsIXPIDLOutputStream
{
    public:
    NS_DECL_ISUPPORTS
    NS_DECL_NSIXPIDLOUTPUTSTREAM
    nsXPIDLOutputStream( );
    nsXPIDLOutputStream( nsIOutputStream *outputStream );
    virtual ~nsXPIDLOutputStream( );
    nsIOutputStream *outputStream;
};
# endif // __nsXPIDLOutputStream_included__
```

Interface: Plug-In
Description: an interface designed to define the default interface for plug-in implementation

```
The scriptable IDL for this interface is nsIXPIDLPlugin.idl
and is as follows:
# include "nsIFactory.idl"
# pragma prefix
[scriptable, uuid(41019dc6-8d53-41fb-b70a-feaa72cfd48b)]
interface nsIXPIDLPlugin: nsIFactory
{
    void createPluginInstance(in nsISupports aOuter,
        in nsIIDRef iid,
        in string pluginMIMEType,
        [retval, iid_is(iid)] out nsQIResult result);
    void initialize( );
    void shutdown( );
```

-continued

```
};
The C code file for the interface is:
# include "nsIPlugin.h"
# include "nsXPIDLPlugin.h"
NS_IMPL_ISUPPORTS1(nsXPIDLPlugin, nsIPlugin)
nsXPIDLPlugin::nsXPIDLPlugin( )
{
    NS_INIT_ISUPPORTS( );
}
nsXPIDLPlugin::nsXPIDLPlugin( nsIXPIDLPlugin *plugin)
{
    NS_INIT_ISUPPORTS( );
    this- >plugin = plugin;
    NS_ADDREF( plugin );
}
nsXPIDLPlugin::~nsXPIDLPlugin( )
{
    NS_RELEASE( plugin );
}
NS_IMETHODIMP
nsXPIDLPlugin::CreatePluginInstance( nsISupports *aOuter,
    REFNSIID aIID,
    const char* aPluginMIMEType,
    void **aResult)
{
        return plugin- >CreatePluginInstance( aOuter, aIID,
        aPluginMIMEType, aResult );
}
NS_IMETHODIMP
nsXPIDLPlugin::Initialize( )
{
    return plugin- >Initialize( );
}
NS_IMETHODIMP
nsXPIDLPlugin::Shutdown( )
{
    return plugin- >Shutdown( );
}
The C header file for the interface is as follows:
# ifndef __nsXPIDLPlugin_included__
# define __nsXPIDLPlugin_included__
# include "nsIPlugin.h"
# include "nsIXPIDLPlugin.h"
class nsXPIDLPlugin : public nsIPlugin
{
    public:
    NS_DECL_ISUPPORTS
    // NS_DECL_NSIXPIDLPLUGIN
    nsXPIDLPlugin( );
    nsXPIDLPlugin( nsIXPIDLPlugin *plugin );
    virtual ~nsXPIDLPlugin( );
    nsIXPIDLPlugin *plugin;
    // from nsIPlugin
    NS_IMETHODIMP CreatePluginInstance( nsISupports *aOuter,
        REFNSIID aIID,
        const char* aPluginMIMEType,
        void **aResult);
    NS_IMETHODIMP Initialize( );
    NS_IMETHODIMP Shutdown( );
};
# endif // __nsIXPIDLPlugin_included__
```

Interface: Plug-In Instance
Description: an interface designed to define the instance of a plug-in implementation

```
The scriptable IDL for this interface is nsIXPIDLPluginInstance
and is as follows:
# include "nsISupports.idl"
# include "nsIXPIDLPluginInstancePeer.idl"
# include "nsIXPIDLPluginStreamListener.idl"
# pragma prefix
[scriptable, uuid(31e78e3a-dcd1-425e-a938-e04260771738)]
interface nsIXPIDLPluginInstance : nsISupports
{
```

-continued

```
    void destroy( );
    void initialize( in nsIXPIDLPluginInstancePeer peer );
    nsIXPIDLPluginStreamListener newStream( );
    // void print( . . . );
    // void setWindow( . . . );
    void start( );
    void stop( );
};
The C code file for the interface is:
# include "nsIPluginInstance.h"
# include "nsXPIDLPluginInstance.h"
NS_IMPL_ISUPPORTS1(nsXPIDLPluginInstance, nsIPluginInstance)
NsXPIDLPluginInstance::nsXPIDLPluginInstance( )
{
    NS_INIT_ISUPPORTS( );
}
nsXPIDLPluginInstance::nsXPIDLPluginInstance
(nsIXPIDLPluginInstance *pluginInstance )
{
    NS_INIT_ISUPPORTS( );
    this- >pluginInstance = pluginInstance;
    NS_ADDREF( pluginInstance );
}
nsXPIDLPluginInstance::~nsXPIDLPluginInstance( )
{
    NS_RELEASE( pluginInstance );
}
NS_IMETHODIMP
nsXPIDLPluginInstance::Destroy( )
{
    return pluginInstance- >Destroy( );
}
NS_IMETHODIMP
nsXPIDLPluginInstance::Initialize
(nsIPluginInstancePeer *peer )
{
    nsIXPIDLPluginInstancePeer *instPeer = new
    nsXPIDLPluginInstancePeer( peer );
    return pluginInstance- >Initialize ( instPeer );
}
NS_IMETHODIMP
nsXPIDLPluginInstance::NewStream
(nsIPluginStreamListener **_retval)
{
    nsIXPIDLPluginStreamListener **sListener;
    nsresult res = pluginInstance- >NewStream
    (sListener );
    *_retval = new
    nsXPIDLPluginStreamListener( *sListener );
    return res;
}
NS_IMETHODIMP
nsXPIDLPluginInstance::Start( )
{
    return pluginInstance- >Start( );
}
NS_IMETHODIMP
nsXPIDLPluginInstance::Stop( )
{
    return pluginInstance- >Stop( );
}
The C header file for the interface is as follows:
# ifndef __nsXPIDLPluginInstance_included__
# define __nsXPIDLPluginInstance_included__
# include "nsIPluginInstance.h"
# include "nsIXPIDLPluginInstance.h"
# include "nsIPluginInstancePeer.h"
# include "nsXPIDLPluginInstancePeer.h"
# include "nsIPluginStreamListener.h"
# include "nsIXPIDLPluginStreamListener.h"
class nsXPIDLPluginInstance : public nsIPluginInstance
{
    public:
    NS_DECL_ISUPPORTS
    // NS_DECL_NSIXPIDLPLUGININSTANCE
    nsXPIDLPluginInstance( );
    nsXPIDLPluginInstance
    (nsIXPIDLPluginInstance *pluginInstance );
    virtual ~nsXPIDLPluginInstance( );
```

```
    nsIXPIDLPluginInstance *pluginInstance;
    // from nsIPluginInstance
    NS_IMETHODIMP Destroy( );
    NS_IMETHODIMP Initialize( nsIPluginInstancePeer *peer );
    NS_IMETHODIMP NewStream
    (nsIPluginStreamListener **_retval );
    NS_IMETHODIMP Start( );
    NS_IMETHODIMP Stop( );
};
# endif // __nsXPIDLPluginInstance_included__
```

Interface: Plug-In Instance Peer
Description: to define the function requirements for plug-ins to ensure compatibility with browser

```
The scriptable IDL for this interface is
nsIXPIDLPluginInstancePeer and is as follows:
# include "nsISupports.idl"
# include "nsIXPIDLPluginTagInfo2.idl"
# include "nsIXPIDLOutputStream.idl"
# pragma prefix
[scriptable, uuid(20cb8d75-b224-46a5-a30f-73a65445e9b3)]
interface nsIXPIDLPluginInstancePeer : nsISupports
{
    readonly attribute string MIMEType;
    readonly attribute unsigned long mode;
    readonly attribute nsIXPIDLPluginTagInfo2 tagInfo;
    string getValue( in long variable );
    nsIXPIDLOutputStream newStream( in string type,
    in string target );
    void setWindowSize( in unsigned long width, in
    unsigned long height );
    void showStatus( in string message );
};
The C code file for the interface is:
# include "nsIPluginInstancePeer.h"
# include "nsXPIDLPluginInstancePeer.h"
# include "nsIOutputStream.h"
# include "nsXPIDLOutputStream.h"
# include "nsIPluginTagInfo2.h"
# include "nsXPIDLPluginTagInfo2.h"
NS_IMPL_ISUPPORTS1(nsXPIDLPluginInstancePeer,
nsIXPIDLPluginInstancePeer)
nsXPIDLPluginInstancePeer::nsXPIDLPluginInstancePeer( )
{
    NS_INIT_ISUPPORTS( );
}
nsXPIDLPluginInstancePeer::nsXPIDLPluginInstancePeer
(nsIPluginInstancePeer *pluginInstancePeer )
{
    NS_INIT_SUPPORTS( );
    this- >pluginInstancePeer = pluginInstancePeer;
    NS_ADDREF( pluginInstancePeer );
}
nsXPIDLPluginInstancePeer::~nsXPIDLPluginInstancePeer( )
{
    NS_RELEASE( pluginInstancePeer );
}
NS_IMETHODIMP
nsXPIDLPluginInstancePeer::GetMIMEType(char * *aMIMEType)
{
    nsMIMEType *mimeType = (nsMIMEType *)aMIMEType;
    return pluginInstancePeer- >GetMIMEType( mimeType );
}
NS_IMETHODIMP
nsXPIDLPluginInstancePeer::GetMode( PRUint32 *aMode )
{
    nsPluginMode *mode = (nsPluginMode *)aMode;
    return pluginInstancePeer- >GetMode( mode );
}
NS_IMETHODIMP
nsXPIDLPluginInstancePeer::GetTagInfo( nsIXPIDLPluginTagInfo2
**aTagInfo )
{
    nsIPluginTagInfo2 *tagInfo;
    nsresult res = pluginInstancePeer ->
        QueryInterface( NS_GET_IID(nsIPluginTagInfo2),
        (void **)&tagInfo );
    if( NS_FAILED(res)) {
        *aTagInfo = NULL;
        return res;
    }
    *aTagInfo = new nsXPIDLPluginTagInfo2( tagInfo );
    return res;
}
NS_IMETHODIMP
nsXPIDLPluginInstancePeer::GetValue( PRInt32 variable,
char**_retval )
{
    nsPluginInstancePeerVariable var =
    (nsPluginInstancePeerVariable)variable;
    return pluginInstancePeer- >GetValue
    (var, (void *)*_retval );
}
NS_IMETHODIMP
nsXPIDLPluginInstancePeer::NewStream( const char *type,
        const char *target,
        nsIXPIDLOutputStream **_retval )
{
nsIOutputStream **oStream;
nsresult nsRes = pluginInstancePeer- >NewStream
( type, target, oStream );
*_retval = new nsXPIDLOutputStream( *oStream );
return nsRes;
}
NS_IMETHODIMP
nsXPIDLPluginInstancePeer::SetWindowSize( PRUint32 width,
PRUint32 height )
{
    return pluginInstancePeer- >SetWindowSize( width, height );
}
NS_IMETHODIMP
nsXPIDLPluginInstancePeer::ShowStatus( const char *message )
{
    return pluginInstancePeer- >ShowStatus( message );
}
The C header file for the interface is as follows:
# ifndef __nsXPIDLPluginInstancePeer_included__
# define __nsXPIDLPluginInstancePeer_included__
# include "nsIXPIDLPluginInstancePeer.h"
# include "nsIPluginInstancePeerh"
class nsXPIDLPluginInstancePeer : public
nsIXPIDLPluginInstancePeer
{
    public:
    NS_DECL_ISUPPORTS
    NS_DECL_NSIXPIDLPLUGININSTANCEPEER
    nsXPIDLPluginInstancePeer( );
    nsXPIDLPluginInstancePeer
    (nsIPluginInstancePeer *pluginInstancePeer );
    virtual ~nsXPIDLPluginInstancePeer( );
    nsIPluginInstancePeer *pluginInstancePeer;
};
# endif // __nsXPIDLPluginInstancePeer_included__
```

Interface: Plug-In Manager
Description: an interface designed to allow communication between plug-in and browser

```
The scriptable IDL for this interface is nsIXPIDLPluginManager
and is as follows:
# include "nsISupports.idl"
# include "nsIXPIDLPluginStreamListener.idl"
# pragma prefix
[scriptable, uuid(f17f6008-e31f-4410-b59b-0bd7df4e4f9b)]
interface nsIXPIDLPluginManager : nsISupports
{
    void getURL( in nsISupports pliginInstance,
        in string url,
        in string target,
```

```
        in nsIXPIDLPluginStreamListener streamListener,
        in string altHost,
        in string referrer,
        in boolean forceJSEnabled );
    void postURL( in nsISupports pluginInstance,
        in string url,
        in unsigned long postDataLength,
        [array, size_is (postDataLength)] in
        octet postData,
        in unsigned long postHeadersLength,
        in string postHeaders,
        in boolean isFile,
        in string target,
        in nsIXPIDLPluginStreamListener streamListener,
        in string altHost,
        in string referrer,
        in boolean forceJSEnabled );
    void reloadPlugins( in boolean reloadPages );
    string userAgent( );
};
The C code file for the interface is:
# include "nsIPluginManager.h"
# include "nsXPIDLPluginManager.h"
# include "nsXPIDLPluginManager2.h"
# include "nsXPIDLPluginStreamListener.h"
NS_IMPL_ISUPPORTS1(nsXPIDLPluginManager,
nsIXPIDLPluginManager)
nsXPIDLPluginManager::nsXPIDLPluginManager( )
{
    NS_INIT_ISUPPORTS( );
}
nsXPIDLPluginManager::nsXPIDLPluginManager
(nsIPluginManager *pluginManager )
{
    NS_INIT_ISUPPORTS( );
    this- >pluginManager = pluginManager;
    NS_ADDREF( pluginManager );
}
nsXPIDLPluginManager::~nsXPIDLPluginManager( )
{
    NS_RELEASE( pluginManager );
}
NS_IMETHODIMP
nsXPIDLPluginManager::GetURL
(nsISupports *pluginInstance,
    const char *url,
    const char *target,
    nsIXPIDLPluginStreamListener *streamListener,
    const char *altHost,
    const char *referrer,
    PRBool forceJSEnabled )
{
nsIPluginStreamListener *sListener = new
nsXPIDLPluginStreamListener( streamListener );
return pluginManager- >GetURL( pluginInstance,
    (char *)url,
    (char *)target,
    sListener,
    (char *)altHost,
    (char *)referrer,
    forceJSEnabled );
}
NS_IMETHODIMP
nsXPIDLPluginManager::PostURL
(nsISupports *pluginInstance,
    const char *url,
    PRUint32 postDataLength,
    PRUint8 *postData,
    PRUint32 postHeadersLength,
    const char *postHeaders,
    PRBool isFile,
    const char *target,
    nsIXPIDLPluginStreamListener *streamListener,
    const char *altHost,
    const char *referrer,
    PRBool forceJSEnabled)
{
nsIPluginStreamListener *sListener = new
nsXPIDLPluginStreamListener( streamListener );
return pluginManager- >PostURL( pluginInstance,
(char *)url,
    postDataLength,
    (char *)postData,
    isFile,
    (char *)target,
    sListener,
    (char *)altHost,
    (char *)referrer,
    forceJSEnabled,
    postHeadersLength,
    postHeaders );
}
NS_IMETHODIMP
nsXPIDLPluginManager::ReloadPlugins( PRBool reloadPages )
{
    return pluginManager- >ReloadPlugins( reloadPages );
}
NS_IMETHODIMP
nsXPIDLPluginManager::UserAgent( char **_retval )
{
return pluginManager- >UserAgent( (const char **)_retval );
}
The C header file for the interface is as follows:
# ifndef __nsXPIDLPluginManager_included__
# define __nsXPIDLPluginManager_included__
# include "nsIXPIDLPluginManager.h"
include "nsIPluginManager.h"
class nsXPIDLPluginManager : public nsIXPIDLPluginManager
{
    public:
    NS_DECL_ISUPPORTS
    NS_DECL_NSIXPIDLPLUGINMANAGER
    nsXPIDLPluginManager( );
    nsXPIDLPluginManager( nsIPluginManager *pluginManager );
    virtual ~nsXPIDLPluginManager( );
    nsIPluginManager *pluginManager;
};
# endif // __nsXPIDLPluginManager_included__
```

Interface: Plug-in Manager 2
Description: an interface designed to be a support interface to plug-in manager interface

```
The scriptable IDL for this interface is
nsIXPIDLPluginManager2 and is as follows:
# include "nsIXPIDLPluginManager.idl"
# pragma prefix
[scriptable, uuid(33731e21-dfe3-4abc-b921-8cd6ccfb0e32)]
interface nsIXPIDLPluginManager2 : nsIXPIDLPluginManager
{
    void beginWaitCursor( );
    void endWaitCursor( );
    string findProxyForURL( in string url );
    boolean supportsURLProtocol( in string protocol );
};
The C code file for the interface is:
# include "nsXPIDLPluginManager2.h"
NS_IMPL_ISUPPORTS1(nsXPIDLPluginManager2,
nsIXPIDLPluginManager2)
nsXPIDLPluginManager2::nsXPIDLPluginManager2( )
{
    NS_INIT_ISUPPORTS( );
}
nsXPIDLPluginManager2::nsXPIDLPluginManager2
(nsIPluginManager2 *pluginManager )
{
    NS_INIT_ISUPPORTS( );
    this- >pluginManager = pluginManager;
    NS_ADDREF( pluginManager);
}
nsXPIDLPluginManager2::~nsXPIDLPluginManager2( )
{
    NS_RELEASE( pluginManager );
}
```

```
NS_IMETHODIMP
nsXPIDLPluginManager2::BeginWaitCursor( )
{
    return pluginManager- >BeginWaitCursor( );
}
NS_IMETHODIMP
nsXPIDLPluginManager2::EndWaitCursor( )
{
    return pluginManager- >EndWaitCursor( );
}
NS_IMETHODIMP
nsXPIDLPluginManager2::FindProxyForURL( const
char *url, char **_retval )
{
    return pluginManager- >FindProxyForURL( url, _retval );
}
NS_IMETHODIMP
nsXPIDLPluginManager2::SupportsURLProtocol( const
char *protocol, PRBool *_retval)
    {
        return pluginManager- >SupportsURLProtocol
        (protocol, _retval );
    }
// from nsXPIDLPluginManager
NS_IMETHODIMP
nsXPIDLPluginManager2::GetURL( nsISupports *pluginInstance,
            const char *url,
            const char *target,
            nsIXPIDLPluginStreamListener *streamListener,
            const char *altHost,
            const char *referrer,
            PRBool forceJSEnabled )
{
    return nsXPIDLPluginManager::GetURL( pluginInstance,
            url,
            target,
            streamListener,
            altHost,
            referrer,
            ForceJSEnabled );
}
NS_IMETHODIMP
nsXPIDLPluginManager2::PostURL( nsISupports *pluginInstance,
            const char *url,
            PRUint32 postDataLength,
            PRUint8 *postData,
            PRUint32 postHeadersLength,
            const char *postHeaders,
            PRBool isFile,
            const char *target,
            nsIXPIDLPluginStreamListener *streamListener,
            const char *altHost,
            const char *referrer,
            PRBool forceJSEnabled )
{
    return nsXPIDLPluginManager::PostURL( pluginInstance,
            url,
            postDataLength,
            postData,
            postHeadersLength,
            postHeaders,
            isFile,
            target,
            streamListener,
            altHost,
            referrer,
            ForceJSEnabled );
}
NS_IMETHODIMP
nsXPIDLPluginManager2::ReloadPlugins( PRBool reloadPages )
{
    return nsXPIDLPluginManager::ReloadPlugins
        (reloadPages );
}
NS_IMETHODIMP
nsXPIDLPluginManager2::UserAgent( char **_retval )
{
        return nsXPIDLPluginManager:UserAgent(_retval );
}
```

```
The C header file for the interface is as follows:
# ifndef __nsXPIDLPluginManager2__included__
# define __nsXPIDLPluginManager2__included__
# include "nsIXPIDLPluginManager2.h"
# include "nsIPluginManager2.h"
# include "nsXPIDLPluginManager.h"
class nsXPIDLPluginManager2 : public nsXPIDLPluginManager,
public nsIXPIDLPluginManager2
{
    public:
        NS_DECL_ISUPPORTS
        NS_DECL_NSIXPIDLPLUGINMANAGER2
        NS_DECL_NSIXPIDLPLUGINMANAGER
        nsXPIDLPluginManager2( );
        nsXPIDLPluginManager2( nsIPluginManager2
        *pluginManager );
        virtual ~nsXPIDLPluginManager2( );
        nsIPluginManager2 *pluginManager;
};
# endif // __nsXPIDLPluginManager2__included__
```

Interface: Plug-In Stream Information

Description: an interface designed to enable the plug-in to access information on incoming data streams The scriptable IDL for this interface is nsIXPIDLPluginStreamInfo and is as follows:

```
# include "nsISupports.idl"
# pragma prefix
[scriptable,
uuid(1bd1e109-7b4c-4820-a80d-2e04b709e74a)]
interface nsIXPIDLPluginStreamInfo : nsISupports
{
    readonly attribute string contentType;
    readonly attribute unsigned long lastModified;
    readonly attribute unsigned long length;
    readonly attribute wstring URL;
    boolean isSeekable( );
    void requestRead( in unsigned long count,
        [array, size_is(count)] in long offsets,
        [array, size is(count)] in unsigned
        long lengths );
};
The C code file for the interface is:
# include "nsXPIDLPluginStreamInfo.h"
NS_IMPL_ISUPPORTS1(nsXPIDLPluginStreamInfo,
nsIXPIDLPluginStreamInfo)
nsXPIDLPluginStreamInfo::nsXPIDLPluginStreamInfo( )
{
    NS_INIT_ISUPPORTS( );
}
nsXPIDLPluginStreamInfo::nsXPIDLPluginStreamInfo
(nsIPluginStreamInfo *pluginStreamInfo )
{
    NS_INIT_ISUPPORTS( );
    this- >pluginStreamInfo = pluginStreamInfo;
    NS_ADDREF( pluginStreamInfo );
}
nsXPIDLPluginStreamInfo::~nsXPIDLPluginStreamInfo( )
{
    NS_RELEASE( pluginStreamInfo );
}
NS_IMETHODIMP
nsXPIDLPluginStreamInfo::GetContentType
(char * *aContentType )
{
    return pluginStreamInfo- >GetContentType
        ((nsMIMEType *)aContentType );
}
NS_IMETHODIMP
nsXPIDLPluginStreamInfo::GetLastModified
(PRUint32 *aLastModified )
{
    return pluginStreamInfo- >GetLastModified
```

-continued
```
        (aLastModified );
}
NS_IMETHODIMP
nsXPIDLPluginStreamInfo::GetLength( PRUint32 *aLength )
{
    return pluginStreamInfo- >GetLength( aLength );
}
NS_IMETHODIMP
nsXPIDLPluginStreamInfo::GetURL( PRUnichar **aURL )
{
    return pluginStreamInfo- >GetURL((const char **)aURL );
}
NS_IMETHODIMP
nsXPIDLPluginStreamInfo::IsSeekable( PRBool *_retval )
{
    return pluginStreamInfo- >IsSeekable(_retval );
}
NS_IMETHODIMP
nsXPIDLPluginStreamInfo::RequestRead( PRUint32 count,
        PRInt32 *offsets,
        PRUint32 *lengths )
{
    nsByteRange *rangeList, *last;
    // rekolbasing data to nsByteRange structure
    for( int i=0; i<count; i++ ) {
        nsByteRange *newRange = new nsByteRange( );
        newRange- >offset = offsets[i];
        newRange- >length = lengths[i];
        newRange- >next = NULL;
        if(i == 0) rangeList = last =
        newRange;
            else {
                last- >next = newRange;
                last = last- >next;
            }
    }
    // make a call
    return pluginStreamInfo- >RequestRead( rangeList );
}
The C header file for the interface is as follows:
# ifndef __nsXPIDLPluginStreamInfo__included__
# define __nsXPIDLPluginStreamInfo__included__
# include "nsIXPIDLPluginStreamInfo.h"
# include "nsIPluginStreamInfo.h"
class nsXPIDLPluginStreamInfo : public
nsIXPIDLPluginStreamInfo
{
    public:
    NS_DECL_ISUPPORTS
    NS_DECL_NSIXPIDLPLUGINSTREAMINFO
    nsXPIDLPluginStreamInfo( );
    nsXPIDLPluginStreamInfo(
    nsIPluginStreamInfo *pluginStreamInfo );
    virtual ~nsXPIDLPluginStreamInfo( );
    nsIPluginStreamInfo *pluginStreamInfo;
};
# endif // __nsXPIDLPluginStreamInfo__included__
```

Interface: Plug-In Stream Listener

Description: an interface designed to enable the plug-in to handle incoming data streams The scriptable IDL for this interface is nsIXPIDLPlugin-StreamListener and is as follows:

```
# include "nsISupports.idl"
# include "nsIXPIDLPluginStreamInfo.idl"
# include "nsIXPIDLInputStream.idl"
# pragma prefix
[scriptable, uuid(c26d873a-9a7d-48D2-8a52-e6d67eafd9c9)]
interface nsIXPIDLPluginStreamListener : nsISupports
{
    const unsigned long STREAM_TYPE_NORMAL = 1;
    const unsigned long STREAM_TYPE_SEEK = 2;
    const unsigned long STREAM_TYPE_AS_FILE = 3;
    const unsigned long STREAM_TYPE_AS_FILE_ONLY = 4;
    readonly attribute unsigned long streamType;
    void onDataAvailable( in nsIXPIDLPluginStreamInfo
    streamInfo,
        in nsIXPIDLInputStream input,
        in unsigned long length );
    void onFileAvailable( in nsIXPIDLPluginStreamInfo
    streamInfo,
        in wstring fileName );
    void onStartBinding( in nsIXPIDLPluginStreamInfo
    streamInfo );
    void onStopBinding( in nsIXPIDLPluginStreamInfo
    streamInfo,
        in long status );
};
The C code file for the interface is:
# include "nsIPluginStreamListener.h"
# include "nsXPIDLPluginStreamListener.h"
NS_IMPL_ISUPPORTS1(nsXPIDLPluginStreamListener,
nsIPluginStreamListener)
nsXPIDLPluginStreamListener::nsXPIDLPluginStreamListener( )
{
    NS_INIT_ISUPPORTS( );
}
nsXPIDLPluginStreamListener::nsXPIDLPluginStreamListener
(nsIXPIDLPluginStreamListener *pluginStreamListener )
{
    NS_INIT_ISUPPORTS( );
    this- >pluginStreamListener = pluginStreamListener;
    NS_ADDREF( pluginStreamListener );
}
nsXPIDLPluginStreamListener::~nsXPIDLPluginStreamListener( )
{
    NS_RELEASE( pluginStreamListener );
}
NS_IMETHODIMP
nsXPIDLPluginStreamListener::GetStreamType
(nsPluginStreamType *result )
{
    return pluginStreamListener- >GetStreamType
    ((PRUint32 *)result );
}
NS_IMETHODIMP
nsXPIDLPluginStreamListener::OnDataAvailable
(nsIPluginStreamInfo *streamInfo,
        nsIInputStream *input,
        PRUint32 length )
{
    nsIXPIDLPluginStreamInfo *sInfo = new
    nsXPIDLPluginStreamInfo
        (streamInfo);
    nsIXPIDLInputStream *iStream = new
    nsXPIDLInputStream( input );
    return pluginStreamListener- >OnDataAvailable
    (sInfo, iStream, length );
}
NS_IMETHODIMP
nsXPIDLPluginStreamListener::OnFileAvailable
(nsIPluginStreamInfo *streamInfo,
        const char *fileName )
{
    nsIXPIDLPluginStreamInfo *sInfo = new
    nsXPIDLPluginStreamInfo
        (streamInfo);
    return pluginStreamListener- >OnFileAvailable
    (sInfo, (PRUnichar *)fileName );
}
NS_IMETHODIMP
nsXPIDLPluginStreamListener::OnStartBinding
(nsIPluginStreamInfo *streamInfo )
{
    nsIXPIDLPluginStreamInfo *sInfo = new
    nsXPIDLPluginStreamInfo
        ( streamInfo );
    return pluginStreamListener- >OnStartBinding( sInfo );
}
NS_IMETHODIMP
nsXPIDLPluginStreamListener::OnStopBinding
(nsIPluginStreamInfo *streamInfo, nsresult status )
```

-continued

```
{
    nsIXPIDLPluginStreamInfo *sInfo = new
    nsXPIDLPluginStreamInfo( streamInfo );
    return pluginStreamListener->OnStopBinding
    (sInfo, (PRInt32)status );
}
```
The C header file for the interface is as follows:
```
# ifndef __nsXPIDLPluginStreamListener_included__
# define __nsXPIDLPluginStreamListener_included__
# include "nsIPluginStreamListener.h"
# include "nsIXPIDLPluginStreamListener.h"
# include "nsIPluginStreamInfo.h"
# include "nsXPIDLPluginStreamInfo.h"
# include "nsIInputStream.h"
# include "nsXPIDLInputStream.h"
class nsXPIDLPluginStreamListener : public
nsIPluginStreamListener
{
    public:
    NS_DECL_ISUPPORTS
    // NS_DECL_NSIXPIDLPLUGINSTREAMLISTENER
    nsXPIDLPluginStreamListener( );
    nsXPIDLPluginStreamListener(
    nsIXPIDLPluginStreamListener *pluginStreamListener );
    virtual ~nsXPIDLPluginStreamListener( );
    nsIXPIDLPluginStreamListener *pluginStreamListener,
    // from nsIPluginStreamListener
    NS_IMETHODIMP GetStreamType
    (nsPluginStreamType *result );
    NS_IMETHODIMP OnDataAvailable
    (nsIPluginStreamInfo *streamInfo,
        nsIInputStream *input,
        PRUint32 length );
    NS_IMETHODIMP OnFileAvailable
    (nsIPluginStreamInfo *streamInfo,
    const char *fileName );
    NS_IMETHODIMP OnStartBinding
    (nsIPluginStreamInfo *streamInfo );
    NS_IMETHODIMP OnStopBinding
    (nsIPluginStreamInfo *streamInfo, nsresult status );
};
# endif // __nsXPIDLPluginStreamListener_included__
```

Interface: Plug-In Tag Information

Description: an interface designed to enable the plug-in to access HTML tag information from the browser The scriptable IDL for this interface is nsIXPIDLPluginTagInfo and is as follows:
```
# include "nsISupports.idl"
# pragma prefix
[scriptable,
uuid(b6506c8a-aaa7-4dd7-a3aa-cb3632f40a48)]
interface nsIXPIDLPluginTagInfo : nsISupports
{
    string getAttribute( in string name );
    void getAttributes( out unsigned long count,
        [array, size_is(count)] out string names,
        [array, size_is(count)]
        out string values );
};
```
The C code file for the interface is:
```
# include "nsXPIDLPluginTagInfo.h"
NS_IMPL_ISUPPORTS1(nsXPIDLPluginTagInfo,
nsIXPIDLPluginTagInfo)
nsXPIDLPluginTagInfo::nsXPIDLPluginTagInfo( )
{
    NS_INIT_ISUPPORTS( );
}
nsXPIDLPluginTagInfo::nsXPIDLPluginTagInfo
(nsIPluginTagInfo *tagInfo )
{
    NS_INIT_ISUPPORTS( );
    this->tagInfo = tagInfo;
    NS_ADDREF( tagInfo );
}
nsXPIDLPluginTagInfo::~nsXPIDLPluginTagInfo( )
{
    NS_RELEASE( tagInfo );
}
NS_IMETHODIMP
nsXPIDLPluginTaginfo::GetAttribute( const char *name,
char **_retval )
{
    return NS_ERROR_NOT_IMPLEMENTED;
}
NS_IMETHODIMP
nsXPIDLPluginTagInfo::GetAttributes( PRUint32 *count,
        char ***names,
        char ***values )
{
    return NS_ERROR_NOT_IMPLEMENTED;
}
```
The C header file for the interface is as follows:
```
# ifndef __nsXPIDLPluginTagInfo_included__
# define __nsXPIDLPluginTagInfo_included__
# include "nsIXPIDLPluginTagInfo.h"
# include "nsIPluginTagInfo.h"
class nsXPIDLPluginTagInfo : public
nsIXPIDLPluginTagInfo
{
    public:
    NS_DECL_ISUPPORTS
    NS_DECL_NSIXPIDLPLUGINTAGINFO
    nsXPIDLPluginTagInfo( );
    nsXPIDLPluginTaginfo( nsIPluginTagInfo *tagInfo );
    virtual ~nsXPIDLPluginTagInfo( );
    nsIPluginTagInfo *tagInfo;
};
# endif // __nsXPIDLPluginTagInfo_included__
```

Interface: Plug-In Tag Information 2

Description: an interface designed to support plug-in tag information interface

The scriptable IDL for this interface is nsIXPIDLPluginTagInfo2 and is as follows:

```
# include "nsIXPIDLPluginTagInfo.idl"
# pragma prefix
[scriptable, uuid(144542ea-52a5-466f-ac65-a34ecbd9966e)]
interface nsIXPIDLPluginTagInfo2 : nsIXPIDLPluginTagInfo
{
    readonly attribute string alignment;
    string getParameter( in string name );
    void getParameters( out unsigned long count,
        [array, size_is(count)] out string names,
        [array, size_is(count)] out string values );
    readonly attribute unsigned long borderHorizSpace;
    readonly attribute unsigned long borderVertSpace;
    readonly attribute string documentBase;
    readonly attribute string documentEncoding;
    readonly attribute unsigned long height;
    readonly attribute unsigned long width;
    readonly attribute string tagText;
    readonly attribute string tagType;
    readonly attribute unsigned long uniqueID;
};
```
The C code file for the interface is:
```
# include "nsXPIDLPluginTagInfo2.h"
NS_IMPL_ISUPPORTS1(nsXPIDLPluginTagInfo2,
nsIXPIDLPluginTagInfo2)
nsXPIDLPluginTagInfo2::nsXPIDLPluginTagInfo2( )
{
    NS_INIT_ISUPPORTS( );
}
nsXPIDLPluginTagInfo2::nsXPIDLPluginTagInfo2
( nsIPluginTagInfo2 *tagInfo )
{
    NS_INIT_ISUPPORTS( );
```

```
        this->tagInfo = tagInfo;
        NS_ADDREF( tagInfo );
}
nsXPIDLPluginTagInfo2::~nsXPIDLPluginTagInfo2( )
{
        NS_RELEASE( tagInfo );
}
NS_IMETHODIMP
nsXPIDLPluginTagInfo2::GetAlignment( char * *aAlignment)
{
        return tagInfo->GetAlignment( (const char **)aAlignment );
}
NS_IMETHODIMP
nsXPIDLPluginTagInfo2::GetParameter( const char *name,
char **_retval )
{
        return tagInfo->GetParameter( name,
        (const char **)_retval );
}
NS_IMETHODIMP
nsXPIDLPluginTagInfo2::GetParameters( PRUint32 *count,
        char ***names,
        char ***values )
{
        return tagInfo->GetParameters( (PRUint16)*count,
        (const char*const*)*names,
        (const char*const*)*values );
}
NS_IMETHODIMP
nsXPIDLPluginTagInfo2::GetBorderHorizSpace
(PRUint32 *aBorderHorizSpace )
{
        return tagInfo->GetBorderHorizSpace
        (aBorderHorizSpace );
}
NS_IMETHODIMP
nsXPIDLPluginTagInfo2::GetBorderVertSpace
(PRUint32 *aBorderVertSpace )
{
        return tagInfo->GetBorderVertSpace
        (aBorderVertSpace );
}
NS_IMETHODIMP
nsXPIDLPluginTagInfo2::GetDocumentBase
(char **aDocumentBase )
{
        return tagInfo->GetDocumentBase
        ((const char **)aDocumentBase );
}
NS_IMETHODIMP
nsXPIDLPluginTagInfo2::GetDocumentEncoding
(char * *aDocumentEncoding )
{
        return tagInfo->GetDocumentEncoding
        ((const char**)aDocumentEncoding );
}
NS_IMETHODIMP
nsXPIDLPluginTagInfo2::GetHeight( PRUint32 *aHeight )
{
        return tagInfo->GetHeight( aHeight );
}
NS_IMETHODIMP
nsXPIDLPluginTagInfo2::GetWidth( PRUint32 *aWidth )
{
        return tagInfo->GetWidth( aWidth );
}
NS_IMETHODIMP
nsXPIDLPluginTagInfo2::GetTagText( char * *aTagText )
{
        return tagInfo->GetTagText( (const char **)aTagText );
}
NS_IMETHODIMP
nsXPIDLPluginTagInfo2::GetTagType( char * *aTagType )
{
        return tagInfo->GetTagType(
        (nsPluginTagType *)aTagType );
}
NS_IMETHODIMP
nsXPIDLPluginTagInfo2::GetUniqueID( PRUint32 *aUniqueID )
{
        return tagInfo->GetUniqueID( aUniqueID );
}
// from TagInfo
NS_IMETHODIMP
nsXPIDLPluginTagInfo2::GetAttribute( const char *name,
char **_retval )
{
        return nsXPIDLPluginTagInfo::GetAttribute(
        name, _retval );
}
NS_IMETHODIMP
nsXPIDLPluginTagInfo2::GetAttributes( PRUint32 *count,
        char ***names,
        char ***values )
{
        return nsXPIDLPluginTagInfo::GetAttributes(count,
        names, values );
}
The C header file for the interface is as follows:
# ifndef __nsXPIDLPluginTagInfo2__included__
# define __nsXPIDLPluginTagInfo2__included__
# include "nsIXPIDLPluginTagInfo2.h"
# include "nsIPluginTagInfo2.h"
# include "nsXPIDLPluginTagInfo.h"
class nsXPIDLPluginTagInfo2 : public nsXPIDLPluginTagInfo,
public
        nsIXPIDLPluginTagInfo2
{
    public:
    NS_DECL_ISUPPORTS
    NS_DECL_NSIXPIDLPLUGINTAGINFO2
    NS_DECL_NSIXPIDLPLUGINTAGINFO
    nsXPIDLPluginTagInfo2( );
    nsXPIDLPluginTagInfo2( nsIPluginTagInfo2 *tagInfo );
    virtual ~nsXPIDLPluginTagInfo2( );
    nsIPluginTagInfo2 *tagInfo;
};
# endif // __nsXPIDLPluginTagInfo2__included__
```

Embodiment of Computer Execution Environment (Hardware)

Figure 7:
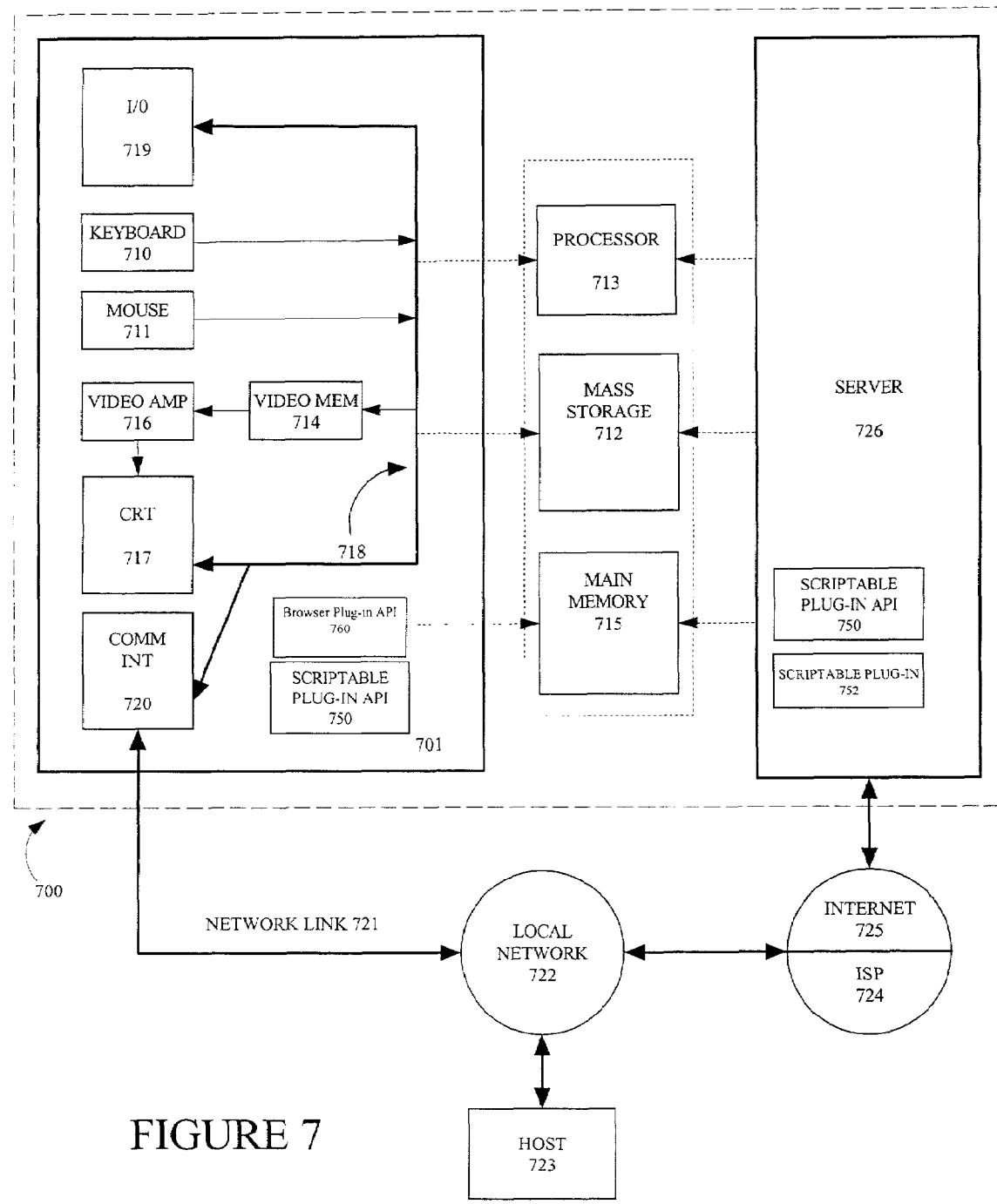
FIG. 7 shows a computer embodiment of the present invention.

An embodiment of the invention can be implemented as computer software in the form of computer readable program code executed in a general purpose computing environment such as environment 700 illustrated in FIG. 7, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 710 and mouse 711 are coupled to a system bus 718. The keyboard and mouse are for introducing user input to the computer system and communicating that user input to central processing unit (CPU) 713. Other suitable input devices maybe used in addition to, or in place of, the mouse 711 and keyboard 710. I/O (input/output) unit 719 coupled to bi-directional system bus 718 represents such I/O elements as a printer, A/V (audio/video) I/O, etc.

Computer 701 may include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Wireless links are also possible.

In any such implementation, communication interface 720 sends and receives electrical, electromagnetic or optical signals which carry digital data streams representing various types of information.

Network link 721 typically provides data communication through one or more networks to other data devices. For example, network link 721 may provide a connection through local network 722 to local server computer 723 or to data equipment operated by ISP 724. ISP 724 in turn provides data communication services through the world wide packet data communication network now commonly referred to as the "Internet" 725. Local network 722 and Internet 725 both use electrical, electromagnetic or optical signals which carry digital data streams. The signals through the various networks and the signals on network link 721 and through communication interface 720, which carry the digital data to and from computer 700, are exemplary forms of carrier waves transporting the information.

Processor 713 may reside wholly on client computer 701 or wholly on server 726 or processor 713 may have its computational power distributed between computer 701 and server 726. Server 726 symbolically is represented in FIG. 7 as one unit, but server 726 can also be distributed between multiple "tiers". In one embodiment, server 726 comprises a middle and back tier where application logic executes in the middle tier and persistent data is obtained in the back tier. In the case where processor 713 resides wholly on server 726, the results of the computations performed by processor 713 are transmitted to computer 701 via Internet 725, Internet Service Provider (ISP) 724, local network 722 and communication interface 720. In this way, computer 701 is able to display the results of the computation to a user in the form of output.

Computer 701 includes a video memory 714, main memory 715 and mass storage 712, all coupled to bi-directional system bus 718 along with keyboard 710, mouse 711 and processor 713. As with processor 713, in various computing environments, main memory 715 and mass storage 712, can reside wholly on server 726 or computer 701, or they may be distributed between the two. Examples of systems where processor 713, main memory 715, and mass storage 712 are distributed between computer 701 and server 726 include the thin-client computing architecture developed by Sun Microsystems, Inc., the palm pilot computing device and other personal digital assistants, Internet ready cellular phones and other Internet computing devices, and in platform independent computing environments, such as those which utilize the Java™ technologies also developed by Sun Microsystems, Inc.

The mass storage 712 may include both fixed and removable media, such as magnetic, optical or magnetic optical storage systems or any other available mass storage technology. Bus 718 may contain, for example, thirty-two address lines for addressing video memory 714 or main memory 715. The system bus 718 also includes, for example, a 32-bit data bus for transferring data between and among the components, such as processor 713, main memory 715, video memory 714 and mass storage 712. Alternatively, multiplex data/address lines maybe used instead of separate data and address lines.

In one embodiment of the invention, the processor 713 is a SPARC microprocessor from Sun Microsystems, Inc., a microprocessor manufactured by Motorola, such as the 680X0 processor, or a microprocessor manufactured by Intel, such as the 80X86 or Pentium processor. However, any other suitable microprocessor or microcomputer may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and may be implemented by any suitable apparatus. This circuitry converts pixel data stored in video memory 714 to a raster signal suitable for use by monitor 717. Monitor 717 is a type of monitor suitable for displaying graphic images.

Computer 701 can send messages and receive data, including program code, through the network(s), network link 721, and communication interface 720. In the Internet example, remote server computer 726 might transmit a requested code for an application program through Internet 725, ISP 724, local network 722 and communication interface 720. The received code may be executed by processor 713 as it is received, and/or stored in mass storage 712, or other non-volatile storage for later execution. In this manner, computer 700 may obtain application code in the form of a carrier wave. Alternatively, remote server computer 726 may execute applications using processor 713, and utilize mass storage 712, and/or video memory 715. The results of the execution at server 726 are then transmitted through Internet 725, ISP 724, local network 722 and communication interface 720. In this example, computer 701 performs only input and output functions.

In one embodiment of the present invention, the scriptable plug-in 752 can reside on server 726. In one embodiment of the present invention, scriptable plug-in 752 is developed earlier on the server with scriptable plug-in API 750. Non-scriptable browser plug-in API 760, as part of a browser, is on computer 701. The browser can download scriptable plug-in 752 from server 726 when it encounters a plug-in reference on an HTML page. Scriptable plug-in API 750 also resides with the browser plug-in API 760 on computer 701. Scriptable plug-in API 750 enables the execution of scriptable plug-in 752 on computer 701.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, an implementation of a scriptable plug-in API is described in conjunction with one or more specific embodiments. The invention is defined by the claims and their full scope of equivalents.

The invention claimed is:

1. A computer-readable memory device encoded with a data structure providing an interface to an application program that is encoded in the computer-readable memory device and that is run by a processor in a data processing system, the date structure comprising:
   a cross platform language API;
   a scriptable language API;
   a first interface operatively configured to connect said cross platform language API and said scriptable language API;
   a non-scriptable plug-in API;
   a second interface operatively configured to connect said non-scriptable plug-in API and said cross platform language API such that said scriptable language API is able to access said non-scriptable plug-in API;

a non-scriptable plug-in object implemented in said non-scriptable plug-in API;

a cross platform language object implemented in said cross platform language API to correspond to said non-scriptable plug-in object; and a scripting language object implemented in said scripting language API;

wherein said second interface operatively connects said non-scriptable plug-in object and said cross platform language object, and said first interface operatively connects said cross platform language object and said scripting language object, such that said cross platform language object operates as a proxy for said non-scriptable plug-in object.

2. The computer-readable memory device of claim 1, wherein said first interface is an XPIDL interface.

3. The computer-readable memory device of claim 1, wherein said second interface is an XPConnect interface.

4. The computer-readable memory device of claim 3, wherein said XPConnect interface uses a typelib file associated with the cross platform language object.

5. The computer-readable memory device of claim 1 wherein said scripting language object is one of a Javascript object, a Perl object, and a Python object.

6. The computer-readable memory device of claim 1, wherein said cross platform language is XPCOM.

7. A method in a data processing system having a program for implementing an API, the method comprising the steps of:

obtaining a cross platform language API;

obtaining a scriptable language API; and implementing a first interface to operatively connect said cross platform language API and said scriptable language API;

obtaining a non-scriptable plug-in API;

implementing a second interface to operatively connect said non-scriptable plug-in API and said cross platform language API such that said scriptable language API is able to access said non-scriptable plug-in API;

defining a non-scriptable plug-in object in said non-scriptable plug-in API;

defining a cross platform language object in said cross platform language API to correspond to said non-scriptable plug-in object; and defining a scripting language object in said scripting language API;

wherein said second interface operatively connects said non-scriptable plug-in object and said cross platform language object, and said first interface operatively connects said cross platform language object and said scripting language object, such that said cross platform language object operates as a proxy for said non-scriptable plug-in object.

8. The method of claim 7, wherein said first interface is an XPIDL interface.

9. The method of claim 7, wherein said second interface is an XPConnect interface.

10. The method of claim 9, wherein said XPConnect interface uses a typelib file associated with the cross platform language object.

11. The method of claim 7, wherein said scripting language object is one of a Javascript object, a Pen object, and a Python object.

12. The method of claim 7, wherein said cross platform language is XPCOM.

13. A tangible computer readable medium containing instructions causing a program in a computer system to perform a method, the method comprising:

obtaining a cross platform language API;

obtaining a scriptable language API; and implementing a first interface to operatively connect said cross platform language API and said scriptable language API;

obtaining a non-scriptable plug-in API;

implementing a second interface to operatively connect said non-scriptable plug-in API and said cross platform language API such that said scriptable language API is able to access said non-scriptable plug-in API;

defining a non-scriptable plug-in object in said non-scriptable plug-in API;

defining a cross platform language object in said cross platform language API to correspond to said non-scriptable plug-in object; and defining a scripting language object in said scripting language API, wherein said first interface operatively connects said cross platform language object and said scripting language object; and said second interface operatively connects said non-scriptable plug-in object and said cross platform language object, such that said cross platform language object operates as a proxy for said non-scriptable plug-in object.

14. The computer readable medium of claim 13, wherein said first interface is an XPIDL interface.

15. The computer readable medium of claim 13, wherein said second interface is an XPConnect interface.

16. The computer readable medium of claim 15, wherein XPConnect interface uses a typelib file associated with the cross platform language object.

17. The computer readable medium of claim 13, wherein said scripting language object is one of a Javascript object, a Perl object, and a Python object.

18. The computer readable medium of claim 13, wherein said cross platform language is XPCOM.

* * * * *